United States Patent [19]

Smith

[11] Patent Number: 4,712,325

[45] Date of Patent: Dec. 15, 1987

[54] FISHING LURE

[76] Inventor: Charles E. Smith, 2321 Grange Hall Rd., Dayton, Ohio 45431

[21] Appl. No.: 842,327

[22] Filed: Mar. 21, 1986

[51] Int. Cl.$^4$ ............................................. A01K 85/00
[52] U.S. Cl. .................................. 43/42.24; 43/42.25; 43/42.28
[58] Field of Search ................... 43/4.5, 42.22, 42.28, 43/42.25, 44.99, 42.30, 42.29, 42.24, 42.06

[56] References Cited

U.S. PATENT DOCUMENTS

| | | | |
|---|---|---|---|
| 567,310 | 9/1896 | Gaide | 43/42.28 |
| 1,750,783 | 3/1930 | Pemberton | 43/42.29 |
| 1,813,416 | 7/1931 | Miles | 43/42.24 |
| 2,168,894 | 8/1939 | Arbogast | 43/42.28 |
| 2,559,542 | 7/1951 | Mintner | 43/42.22 |
| 3,343,296 | 9/1967 | Davis | 43/42.28 |
| 3,828,463 | 8/1974 | Perrin | 43/42.28 |
| 3,855,722 | 12/1974 | Moore | 43/42.28 |
| 3,959,912 | 6/1976 | Lee | 43/42.28 |
| 3,964,203 | 6/1976 | Williams | 43/42.06 |
| 4,074,454 | 2/1978 | Cordell | 43/42.28 |
| 4,206,236 | 6/1980 | Orth | 43/4.5 |

Primary Examiner—M. Jordan
Attorney, Agent, or Firm—Biebel, French & Nauman

[57] ABSTRACT

A fishing lure which includes a body having a head portion and a hook extending rearwardly therefrom, and a plurality of thin, elongate strips of chamois attached to the body rearwardly of the head portion and extending outwardly therefrom. The porous chamois material absorbs water to swell in size and become flexible when the lure is immersed in water, giving the lure a life-like appearance. The chamois material is sufficiently porous to absorb fish scent attractants. A preferred attractant is a mixture of propylene glycol and ground live bait, such as shad or crayfish.

6 Claims, 5 Drawing Figures

FISHING LURE

BACKGROUND OF THE INVENTION

The present invention relates to fishing lures and more particularly, to fishing lures adapted to carry a fish attractant.

Many fishing lures are specifically designed to mimic the appearance of the nature prey of a particular game fish. Of these lures, there are many types which take on the appearance of frogs, minnows, crayfish and the like, and include bodies fitted with barbed hooks, which have the general shape and coloration of these animals. However, a disadvantage with these types of lures is that the taste and feel of the lure body is distinctly different from the prey which they are designed to mimic, so that the game fish often spits out the lure body upon sensing its taste and feel. This action by the game fish often occurs so rapidly that the fisherman does not have sufficient reaction time to set the barbed hooks.

More sophisticated lures are made not only to mimic the appearance of the prey, but to duplicate its taste, feel and texture as well. Such lures include bodies made of rubber or plastic. Furthermore, in order to attract game fish from a much wider area than would be attracted merely by the visual appearance of the lure, many fisherman coat the lure bodies with scent attractant, which often includes ground fish or crayfish as a component. A disadvantage with these types of lures is that the material comprising the lure body, while of the appropriate texture and feel, does not hold the attractant for a prolonged period of time. In many instances, the attractant leaves the lure body in less time than it takes to perform a single cast and retrieval.

In an attempt to overcome this disadvantage, it is known to attach a strip of leather or leather-like material to the lure body by passing one on the lure hooks through the end of the strip. While the leather-like material has a tendency to retain the fish attractant longer than the lure bodies, they are still not satisfactory in retaining the fish attractant for long periods of time. A further disadvantage of these types of "add-on" strips is that they tend to spoil the appearance and action of the fishing lures to which they are attached.

Accordingly, there is a need for a fishing lure that not only mimics the appearance of prey of game fish, but assumes the taste, texture and feel of the prey as well. In addition, there is a need for such lures which are adapted to absorb and retain fish attractant for prolonged periods of time.

SUMMARY OF THE INVENTION

The present invention is a fishing lure having a body which includes a plurality of relatively thin, elongate strips of chamois, and a rearwardly-positioned hook. The chamois strips are sized such that they extend rearwardly of the hook so that they may trail the hook when the lure is being retrieved. In a preferred embodiment, the lure body includes a weighted head portion which includes an eyelet for attachment to a fishing line. The head portion is weighted so that the lure body will sink head first.

The lure of the present invention possesses several advantages over prior art lures which stem from the use of strips of chamois. For example, the chamois material is extremely absorbent and is capable of retaining fish attractant for a much longer duration than prior art lure bodies and leather strips. In a preferred embodiment of the invention, a fish attractant is applied to the chamois strips which comprises a mixture of a preservative, such as propylene glycol, and ground live bait. The perferred forms of ground live bait include shad and crayfish.

Although chamois is relatively rough and is somewhat stiff when dry, the chamois strips change completely from these charcteristics when wet. Wet chamois strips become extremely flexible and have a tendency to radiate outwardly from the body in all directions, each strip standing apart from the others. The extreme flexibility of the strips when wet allows them to writhe independently of each other in life-like fashion when the lure is retrieved or when dangling in a slight current.

Another advantage of the present invention is that the chamois material, when wet, closely mimics the taste, texture and feel of game fish prey. It is inherent in the chamois material that it becomes soft, supple and somewhat slick when wet. Thus, the chamois material more closely approximates game fish prey than other artificial lure materials such as leather, rubber, or plastic.

Another advantage of the lure of the present invention is that the chamois material enables the lure to be cast long distances. The chamois absorbs water when wetted and this water increases the weight of the lure, enabling it to be cast a longer distance than a similarly non-absorbent lure.

Accordingly, it is an object of the present invention to provide a fishing lure which closely mimics the appearance of game fish prey; a fishing lure comprised of a material which is capable of absorbing and holding fish attractant for prolonged periods of time; and a fishing lure which closely mimics the texture and feel of game fish prey.

Other objects and advantages of the invention will be apparent from the following description, the accompanying drawings, and the appended claims.

DETAILED DESCRIPTION OF THE PREFERRED EMBODIMENT

Figure 1:
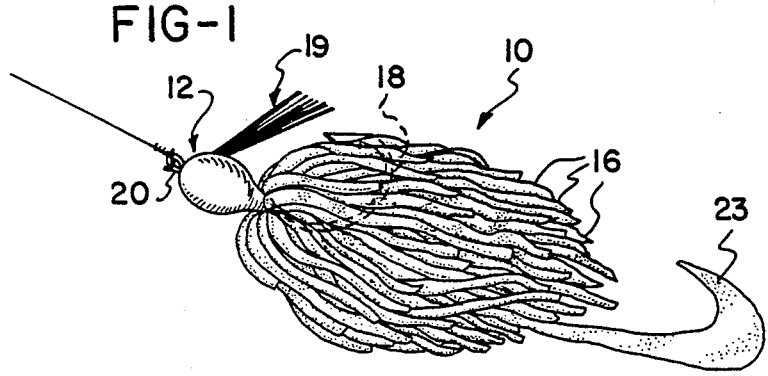
FIG. 1 is a perspective view of a fishing lure of the present invention, shown dry.
Figure 3:
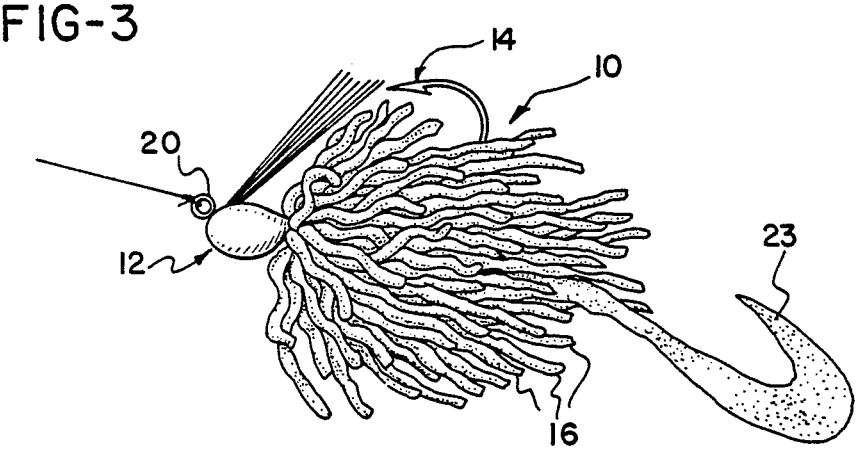
FIG. 3 is a side elevation of the fishing lure of FIG. 1, shown wet.
Figure 5:
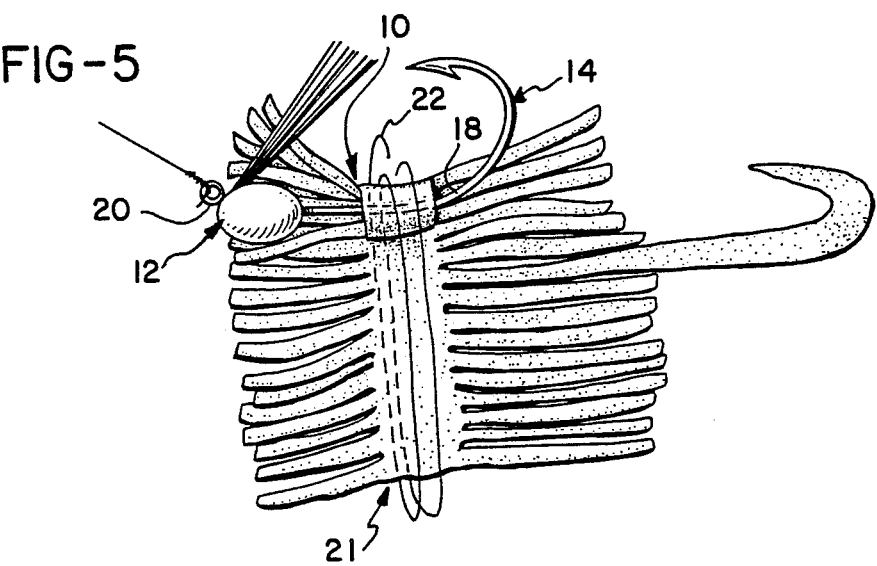
FIG. 5 is a somewhat schematic side elevation of the lure of FIG. 1.

As shown in FIGS. 1, 3, and 5, the fishing lure of the present invention includes a body 10 which consists of a head portion 12, a hook portion 14, and a plurality of relatively thin, elongate strips 16 of chamois. In the embodiment shown, the head portion 12 comprises lead which is cast around the shank 18 of the hook portion 14, and is painted with an enamel paint. A nylon bristle weed guard 19 is attached to the head portion 12 in a conventional manner. The hook portion 14 terminates in an eyelet 20 which protrudes from the head portion 12.

As best shown in FIG. 5, the strips 16 are formed by making parallel slits in a length 21 of chamois material. The strips may therefore be formed in one stamping operation. The length 21 is wrapped about the shank 18 and is held in position by a nylon thread 22 which is tied around the midportion of the length of material, so that the forward ends of the strips fold over and obscure the thread. The strips 16 are attached to the body 10 so that they extend about the periphery of the shank 18.

Figure 2:
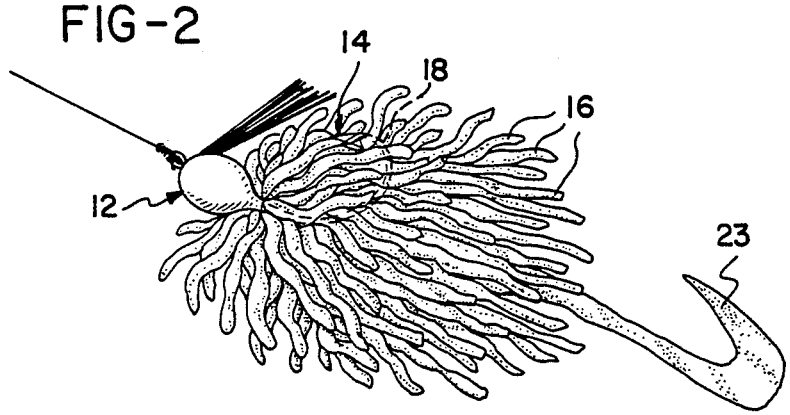
FIG. 2 is a perspective view of the fishing lure of FIG. 1, shown wet.
Figure 4:
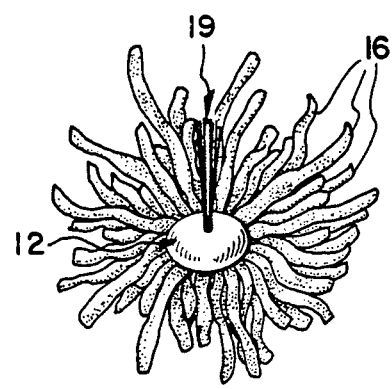
FIG. 4 is a front elevation of the fishing lure of FIG. 1, shown wet.

As shown in FIG. 1, when dry, the body 10 is compact and the strips 16 are relatively stiff and lie flat against the shank 18. However, as shown in FIGS. 2, 3 and 4, when the lure is immersed in the water, the strips 16 become wetted and absorb water. Consequently, each individual strip swells and becomes flexible. Although the exact mechanism is not known, the strips 16 tend to radiate outwardly from the shank 18 of the hook portion 14.

In a preferred embodiment of the invention, the strips 16 are of varying lengths, are positioned rearwardly of the head portion 12, and are sized so that they trail rearwardly of the hook portion 14 and flare outwardly. The result is that the lure body 10 assumes a shaggy appearance. It has also been found desirable to provide a single long strip 23 which trails behind the other strips 16.

As a result of the flexibility of the strips 16 when wet, the individual strips tend to separate from each other, and any slight jerking movement of the lure causes the individual strips to writhe or wave independently, imparting an unique, life-like action to the lure.

Furthermore, the chamois material comprising the strips 16 is relatively fibrous on its surface. This fiberous surface is believed to impart a life-like texture and feel to the strips which does not repulse the game fish for which the lure is designed to attract. It has been found that best results are obtained when the strips 16 are approximately ⅛ inch wide, 1/32 to 3/32 inches thick, and vary in length from one inch to three inches.

A fish attractant which is particularly effective with the lure is a mixture of propylene glycol, as a preservative, and ground live bait. A preferred form of ground live bait is shad or crayfish. A preferred mixture is about one part by volume of ground live bait to one part propylene glycol. It has been found that the propylene glycol preservative is absorbed more rapidly into the chamois strips 16 and is retained on the strips for a longer period of time than the oil based preservatives of other well-known attractants. Since the propylene glycol is water soluble, the ground live bait is slowly released in the water. This slow release is not possible with oil based attranctants.

While the form of apparatus herein described constitutes a preferred embodiment of the invention, it is to be understood that the invention is not limited to this precise form of apparatus, and that changes may be made therein without departing from the scope of the invention.

What is claimed is:

1. A fishing lure comprising:
a body having a weighted head portion with means for attaching fishing line thereto and a hook portion having a shank extending rearwardly therefrom; and
a plurality of relatively thin, elongate strips of chamois attached to said shank rearwardly of said head portion, said strips being of varying lengths, thereby imparting a shaggy appearance to said lure, and being attached to said shank completely about a periphery thereof such that said strips radiate radially outwardly from said shank about an entire periphery thereof when said lure is immersed in water, said strips each having a free end trailing behind said head portion.

2. The fishing lure of claim 1 further comprising a scent material deposited on the absorbed into said strips.

3. The fishing lure of claim 2 wherein said scent material comprises a mixture of propylene glycol and ground live bait.

4. The fishing lure of claims 3 wherein said live bait is selected from the group consisting of shad and crayfish.

5. The fishing lure of claim 1 further comprising a scent material deposited on and absorbed into said strips, said material comprising a mixture of propylene glycol and a ground live bait selected from the group consisting of shad and crayfish.

6. The fishing lure of claim 1 wherein said strips comprise opposing longitudinal edges of a single length of chamois which is wrapped about and secured to said shank.

* * * * *